Figure 3:
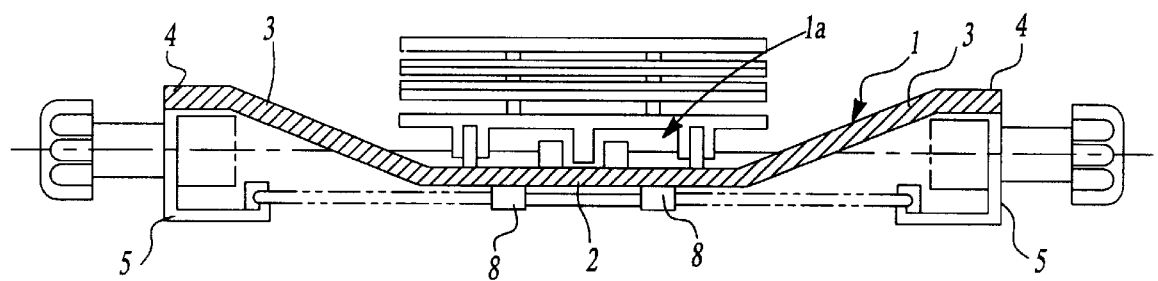

United States Patent [19]
Schuster, Sr. et al.

[11] Patent Number: 6,079,783
[45] Date of Patent: Jun. 27, 2000

[54] BACK-REST WITH ADJUSTABLE LORDOSIS SUPPORT FOR SEATS

[75] Inventors: Wilhelm Schuster, Sr., Linz, Austria; Knud Klingler, Nürnberg, Germany

[73] Assignee: Wilhelm Schuster, Senior, Linz, Austria

[21] Appl. No.: 08/702,677

[22] PCT Filed: Feb. 21, 1995

[86] PCT No.: PCT/EP95/00618

§ 371 Date: Oct. 17, 1996

§ 102(e) Date: Oct. 17, 1996

[87] PCT Pub. No.: WO95/22270

PCT Pub. Date: Aug. 24, 1995

[30] Foreign Application Priority Data

Feb. 21, 1994 [DE] Germany ............................ 44 05 495

[51] Int. Cl.⁷ .................................................. A47C 3/025
[52] U.S. Cl. ..................................... 297/284.4; 297/284.1
[58] Field of Search ........................... 297/284.4, 284.1, 297/284.7

[56] References Cited

U.S. PATENT DOCUMENTS

| | | |
|---|---|---|
| 4,182,533 | 1/1980 | Arndt et al. . |
| 4,541,670 | 9/1985 | Morgenstern et al. ............... 297/284.7 |
| 4,632,454 | 12/1986 | Naert . |
| 5,217,278 | 6/1993 | Harrison et al. ..................... 297/284.7 |

FOREIGN PATENT DOCUMENTS

| | | |
|---|---|---|
| 0011396 | 5/1980 | European Pat. Off. . |
| 2346125 | 3/1975 | Germany . |
| 487420 | 6/1938 | United Kingdom . |

OTHER PUBLICATIONS

English language translation of the abstract of DE 2,346,125.

*Primary Examiner*—Milton Nelson, Jr.
*Attorney, Agent, or Firm*—Howard & Howard

[57] ABSTRACT

A back rest for a seat wherein the back rest includes a support member having first and second edge surfaces, a central plate between the edge surfaces, a first side member coupling the central plate to the first edge surface, and a second side member coupling the central plate to the second edge surface. The central plate of the support member is recessed from the first and second end surfaces to define a cavity. The back rest further includes a plurality of protrusions extending from the central plate and into the cavity. Additionally, the back rest includes a lordosis support having first and second ends coupled to the plurality of protrusions, at least one of the first and second lordosis support ends being coupled to the plurality of protrusions for movement relative to the support member. The lordosis support is adapted to bow upon displacement of one of the first end and the second end thereof toward one another thereby forming a curvature. In another embodiment a back rest includes a support member defining an opening and a separately formed bulge member defining side surfaces and a central plate recessed from and integral with the side surfaces to define a cavity. The back rest according to this embodiment also includes connectors for coupling the bulge member to the support member.

50 Claims, 2 Drawing Sheets

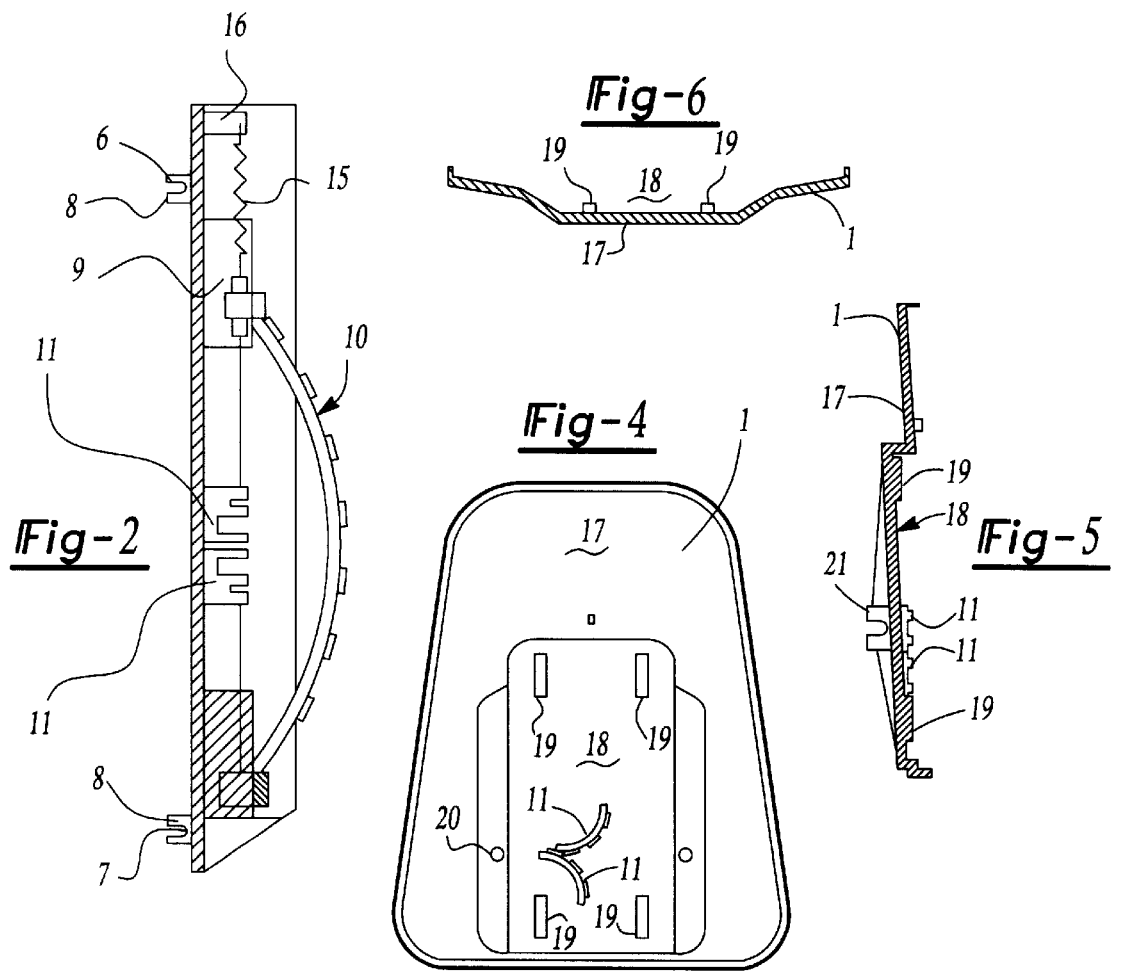
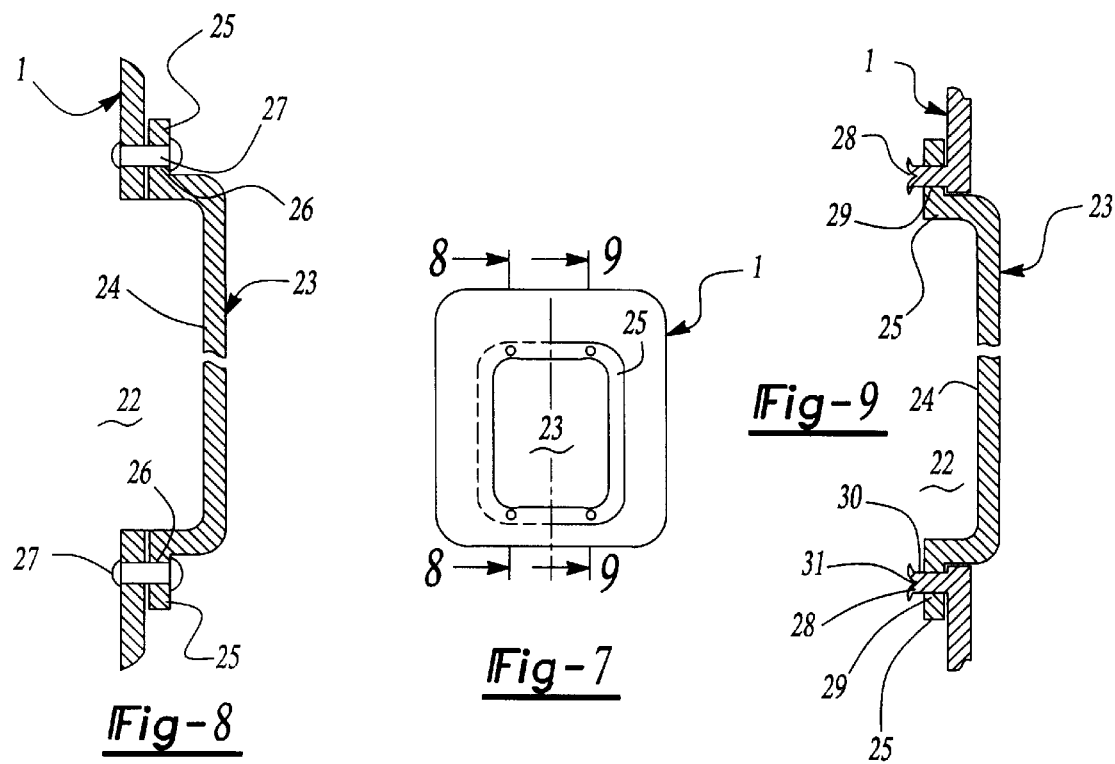

BACK-REST WITH ADJUSTABLE LORDOSIS SUPPORT FOR SEATS

The invention concerns a back-rest for seats of all kinds, especially for car seats, office chairs and armchairs, with an essentially flat support piece and an adjustable lordosis support, where the flat support piece is constructed, at least in the area where the lordosis support is located, as a tub-like bulge, which contains protrusions as holding devices and/or guides for attaching and guiding the lordosis support.

From the EP-A1-0 011 396, the U.S. Pat. No. 4,182,533 and the DE-A-23 46 125, back-rests for seats in accordance with the characterizing portion of claim 1 are known.

In these cases, the flat support piece is always of a large size and thus it is difficult to handle during the mounting of the adjustable lordosis support.

It is the objective of the invention to construct the back-rest of a seat with a flat support piece and with an adjustable lordosis support in such a manner that the production and mounting are simplified.

This objective is being achieved by a back-rest having the characteristics of claim 1.

Information concerning advantageous embodiments of the invention can be gathered from the subordinate claims.

Figure 1:
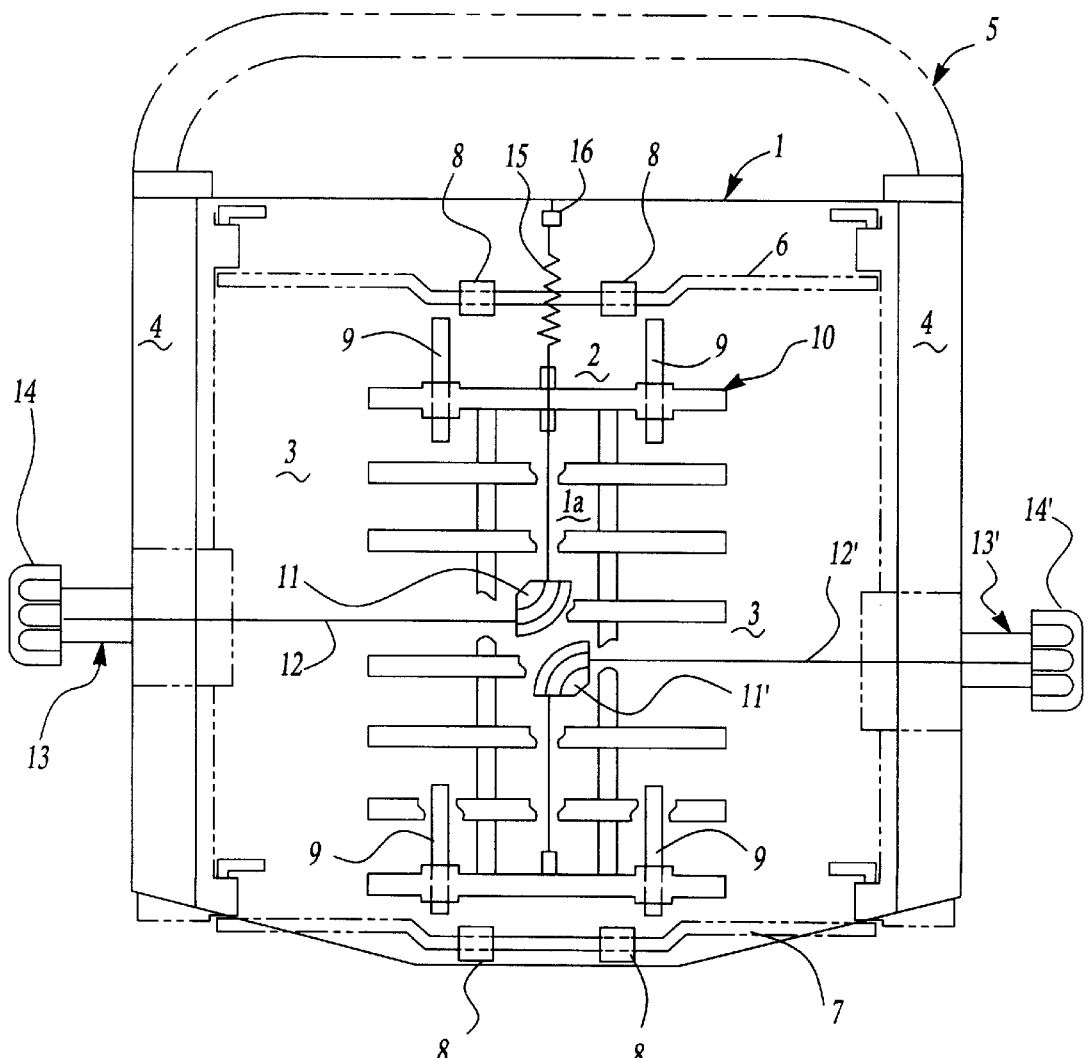

The invention will be explained below in more detail on the basis of different examples of its embodiments and by reference to the drawings. The following is shown:

FIG 1 a support piece for a back-rest in the form of a channel, which is disposed at a frame and contains a lordosis support, which can be adjusted with regard to its height and its curvature;

FIG. 2 the same as in FIG. 1 in a longitudinal section;

FIG. 3 the same as in FIG. 1 in a transverse section;

FIG. 4 a support piece for a back-rest, which has been integrated into a bowl with a bulge;

FIG. 5 the same as in FIG. 3 in a longitudinal section;

FIG. 6 the same as in FIG. 3 in a transverse section;

FIG. 7 a support piece for a back-rest with a recess, in which a separate formed part with a bulge has been disposed;

FIG. 8 a section along line VIII—VIII in FIG. 7;

FIG. 9 a section along line IX—IX in FIG. 7;

In FIGS. 7 to 9, examples of an embodiment in accordance with the claims are shown, whereas the example of the embodiment shown in FIGS. 1 to 6 only show individual characteristics of the claims.

The example of the embodiment of a back-rest shown in FIGS. 1 to 3 includes a support piece 1 in the shape of a channel 1a with a central plate 2 and with side pieces 3, which are disposed at an angle to it, while their free edges 4, which are at an angle, are supported on the lateral bars of a frame 5 of a back-rest.

The support piece 1 consists of an essentially rigid material, for example of a plastic material, while the frame 5 consists preferably of a metal and can be constructed in a U-shaped form. The support piece 1 is additionally attached to the cross-struts 6 and 7—preferably made of metal—of the frame 5 by means of fastening elements 8, which are disposed at the rear side of the support piece 1. In the example of the embodiment, the cross-struts 6, 7 have a circular cross-section, and the fastening elements 8 (FIG. 2 and 3) on the rear side of the support piece 1 are constructed as snap connections for receiving the cross-struts 6, 7. By means of this type of snap connection, the support piece 1 can be attached to the frame 5 in a simple and rapid manner without the use of a tool.

In the central plate 2, two guides 9 are provided, both at the top and at the bottom, on which guides the upper and the lower end of the lordosis support 10 are positioned in such a manner that they are both movable. The guides 9 are preferably made in such a way that the lordosis support 10 can be inserted in them or placed upon them without a tool, preferably in the form of any type of known slide and/or snap connections. The guides 9 can, for example, be made as protruding rails or in the form of recesses, and they have the purpose of placing the ends of the lordosis supports 10 in or upon them in such a manner that they are movable.

In the central plate 2, two guides 9 are provided, both at the top and at the bottom, on which guides the upper and the lower end of the lordosis support 10 are positioned in such a manner that they are both movable. The guides 9 are preferably made in such a way that the lordosis supports 10 can be inserted in them or placed upon them without a tool, preferably in the form of any type of known slide and/or snap connections. The guides 9 can, for example, be made as protruding rails or in the form of recesses, and they have the purpose placing the ends of the lordosis supports 10 in or upon them in such a manner that they are movable.

The plate 2 further contains two deflection elements 11 and 11'. Around the deflection elements 11 or 11', respectively, cable pulls 12 or 12' respectively, which are deflected by approximately 90°, are guided toward adjustment devices 13 or 13', respectively, by means of control knobs 14, 14' along the frame 5. The other ends of the cable pulls 12, 12' are fastened to the upper ends or the lower ends, respectively, of the lordosis support 10.

In the example of the embodiment, a tension spring 15 is secured to the upper end of the lordosis support 10, which tension spring is attached to a holding device 16 at its other end. By turning the control knob 14 of the adjustment device 13 with the assistance of the tension spring 15, the cable pull 12 is elongated or shortened, respectively, which makes it possible to adjust the height of the lordosis support 10. By turning the control knob 14' of the adjustment device 13', the cable pull 12' can be shortened or elongated, respectively, which makes it possible to cause the elastic lordosis support 10 to be curved more or to be relaxed, i.e. to become flatter. By the use of the deflection elements 11, 11' the need for a Bowden control shell for the adjustment of the lordosis support 10 no longer exists, which reduces the production costs, because now merely a cable pull 12, 12' will be needed for each adjustment device 13, 13'; finally, the assembly will also be made easier by the simple placement of the cable pull, which is suspended free of tension, upon the deflecting elements 11, 11'.

Instead of the two guides 9, two holding devices (not shown) can be provided on the top and the bottom of the plate 2 in order to provide a fixed receiving means for one end of the lordosis support 10. In this case, the lordosis support 10 would only be able to be given an outward curvature, but its height would not be adjustable.

Preferably, the plate 2 along with the fastening elements 8 and the guides 9, and possibly also including the holding devices, and under certain circumstances even including the deflection elements (11, 11'), would be produced in one piece from plastic in an injection molding process, which would reduce the production costs to a minimum. In order to ensure a wide range of adaptability to differently shaped cross-struts 6, 7 and to facilitate their disposal at various distances, the fastening elements 8 can be, in accordance with a version not shown, made separately and can be inserted into horizontal and/or vertical slots in the plate 2 (not shown).

In the case of the example of the configuration of a back-rest shown in FIGS. 4 to 6, which is known in particular from the example of office chairs, the flat support piece 1 is made in the shape of a bowl 17. The bowl 17 includes a tub-like bulge 18, which has the form of an approximately rectangular recess for receiving a lordosis support, which is not shown. In the bulge 18 protrusions 19 are provided, which function as holding devices and/or guides for the attachment and the guidance of a lordosis support, as has been shown in the description of FIGS. 1 to 3.

In the bulge 16, a deflection element 11 can be provided, or there can also be two deflection elements 11, which then would be disposed as mirror images of each other, and which can serve the purpose of deflecting one or two cable pulls, which are attached to the upper and/or the lower end of the lordosis support. This embodiment of the support piece 1 is preferably made of a plastic material in one piece, and it includes a through hole 20 for the cable pull leading to an adjustment device (not shown), which through hole is located at one or, if necessary, at both sides of the lateral boundary of the recessed bulge 18. The bowl 17 may contain elements 21 at its rear side, which are not described in detail, which elements have the purpose of attaching the back-rest to a seat.

In the example of an embodiment shown in FIG. 7, the flat support piece 1 can have any contour or even spatial shape at all, which is adapted to the particular purpose of use. In the area where the lordosis support is to be placed (not shown), the support piece 1 contains an open recess 22. Above the recess 22, a separate formed piece 23 can be disposed, which has a tub-like bulge 24 with a flange-like edge 25. The formed piece 23 includes the guides and the holding devices as well as the deflection elements, as they have been described in the embodiments, that were discussed earlier. It has been made or adapted for the reception of an adjustable lordosis support. The formed part 23 with its edge 25 can be attached in such a manner above the recess 22, that it either completely or partly covers it, and in this manner it (the formed part) facilitates the attachment above or below the support piece 1.

The attachment of the formed part 23 to the support piece 1 can be achieved in several different ways. According to FIG. 8, the support piece 1 as well as the edge 25 of the formed part 23 contain drilled holes 26, which can be brought into alignment with one another, and where the drilled holes 26 of one of the parts can be made as elongated holes in order to make the assembly easier, in which case the drilled holes are then disposed in such a manner that they are displaced relative from each other by 90°. By means of these drilled holes 26, the support piece 1 can be connected to the formed part 23 in a permanent and fixed manner or detachably, for example, by means of rivets 27 or by screw connections. If the formed part 23 is attached to the support piece 1 (see FIG. 9), in which case its bulge 24 extends through the recess 22, protrusions 28 can be added to the support piece 1 in such a manner that their location corresponds to that of the round holes or even the elongated holes 29 in the edge 25 of the formed part 23. These protrusions 28 can contain an expandable head 30, for example with a slot 31, which can be diverted during their introduction through a hole or an elongated hole 29, and which then once again expands in the end position—thus seeing to it that the formed part 23 is locked to the support piece 1. This embodiment constitutes a simple design and the protrusions 28 with the expandable heads 30 as well as the holes 29 can be manufactured, along with the individual parts required, without any additional steps by means of the injection molding process and with the use of plastic materials. The protrusions 28 can, of course, also be located in the formed part 23, and the holes 29 in the support piece 1. The heads 30 of the protrusions can also be molded in place as a means of connecting the two parts. It is also possible to attach the support piece 1 to the formed part 23 by means of any kind of adhesive, locking, snap or coupling connection.

The bulges are preferably of a rectilinear configuration, because they have the purpose of receiving the lordosis supports, which in most cases have matching dimensions. For reasons of manufacturing technology, the lateral edges of the bulges can be tapered and the corners rounded. For reasons of appearance, the bulges can also have different contours, for example they can be round, oval or polygonal.

The support pieces, in any configuration, are preferably made of plastic by means of an injection molding or a forming process, which can also include the use of reinforcement inserts. However, the use of any material at all is possible, for example one that can be formed or a composite material may be used.

We claim:

1. A back rest for a seat, said back rest comprising:
   a support member including an edge surface and a central plate recessed from said edge surface to define a cavity;
   protrusions coupled to said central plate;
   a lordosis support having first and second ends coupled to said protrusions for movement relative to said support member, said lordosis support adapted to bow upon displacement of one of said first and second ends toward the other of said first and second ends thereby forming a curvature; and
   actuator means coupled to said lordosis support, said actuator means including a vertical adjustor for selectively vertically moving said first and second ends of said lordosis support relative to said support member and an arching adjustor for changing the curvature of said lordosis support.

2. The back rest of claim 1 wherein each of said protrusions guide the vertical movement of said lordosis support relative to said support member.

3. The back rest of claim 1 wherein said arching adjustor includes a first cable and a first controller coupled to said support member for movement relative thereto, said first cable coupled to said first controller, extending into said cavity, and coupled to said lordosis support.

4. The back rest of claim 3 wherein said arching adjustor further includes a deflection element disposed in said cavity and coupled to said support member, said first cable operationally coupled to said deflection element such that said deflection element deflects said first cable between said first controller and said lordosis support.

5. The back rest of claim 3 wherein said lordosis support further includes aide member interconnecting said edge surface and said central plate, said side member defines an opening and said first cable extends from said first controller through said opening and into said cavity.

6. The back rest of claim 3 wherein said vertical adjustor includes a second cable and a second controller coupled to said support member for movement relative thereto, said second cable coupled to said second controller, extending into said cavity, and coupled to said lordosis support.

7. The back rest of claim 6 wherein said lordosis support further includes a side member interconnecting said edge surface and said central plate, wherein said side member defines a hole and said second cable extends from said second controller, through said hole and into said cavity.

8. The back rest of claim 6 wherein said vertical adjustor further includes a deflection element disposed in said cavity and coupled to said support member, said second cable operationally coupled to said deflection element such that said deflection element deflects said second cable between said second controller and said lordosis support.

9. A back rest for a seat, said back rest comprising:
a support member including first and second edge surfaces, a central plate, a first side member coupling said central plate to said first edge surface, and a second side member coupling said central plate to said second edge surface, said first edge surface extending outwardly from said first side member and away from said central plate, said second edge surface extending outwardly from said second side member and away from said central plate, said central plate being recessed from said first and second edge surfaces to define a cavity; and
a plurality of protrusions extending from said central plate and into said cavity for coupling a lordosis support to said support member.

10. The back rest of claim 9 further including a lordosis support having first and second ends coupled to said plurality of protrusions, at least one of said first and second lordosis support ends being coupled to said plurality of protrusions for movement relative to said support member, said lordosis support adapted to bow upon displacement of one of said first end and said second end thereof toward one another thereby forming a curvature.

11. The back rest of claim 10 further including arching adjustor means coupled to said lordosis support for adjusting the curvature of said lordosis support, said arching adjustor means includes a first cable and a first controller coupled to said support member for movement relative thereto, said first cable coupled to said first controller, extending into said cavity, and coupled to said lordosis support.

12. The back rest of claim 11 wherein said arching adjustor means further includes a deflection element disposed in said cavity and coupled to said support member, said first cable operationally coupled to said deflection element such that said deflection element deflects said first cable between said first controller and said lordosis support.

13. The back rest of claim 11 wherein said first side member defines an opening and said first cable extends from said first controller through said opening and into said cavity.

14. The back rest of claim 10 wherein each of said first and second ends of said lordosis support are coupled to said protrusions for vertical movement relative to said support member.

15. The back rest of claim 14 further including vertical adjustor means coupled to said lordosis support for vertically moving said first and second lordosis support ends relative to said support member, said vertical adjustor means includes a second cable and a second controller coupled to said support member for movement relative thereto, said second cable coupled to said second controller, extending into said cavity, and coupled to said lordosis support.

16. The back rest of claim 15 wherein said second side member defines a hole and said second cable extends from said second controller, through said hole and into said cavity.

17. The back rest of claim 15 wherein said vertical adjustor means further includes a deflection element disposed in said cavity and coupled to said support member, said second cable operationally coupled to said deflection element such that said deflection element deflects said second cable between said second controller and said lordosis support.

18. The back rest of claim 15 wherein each of said plurality of protrusions guides the vertical movement of said lordosis support relative to said support member.

19. The back rest of claim 15 wherein at least one of said plurality of protrusions guides the movement of one of the first and second ends of said lordosis support.

20. The back rest of claim 10 wherein one of said first and second ends of said lordosis support is fixedly coupled to it least one of said plurality of protrusions.

21. The back rest of claim 10 wherein at least one of said plurality of protrusions is a rail and said lordosis support is coupled to said support member by sliding engagement with said rail.

22. The back rest of claim 10 wherein said central plate includes recesses defining said protrusions and wherein said lordosis support is coupled to said support member in a snap-fit engagement with said recesses.

23. The back rest of claim 9 wherein said central plate is integral with said first and second side members, said first and second side members being integral with said first and second edge surfaces.

24. The back rest of claim 9 wherein said protrusions are integral with said central plate.

25. The back rest of claim 9 herein said support member further includes an upper end and a lower end and said cavity extends between said upper end and said lower end to define a channel therebetween.

26. The back rest of claim 9 further including a frame and coupling means for connecting said support member to said frame.

27. The back rest of claim 26 wherein said coupling means includes a connector element coupled to said frame, and a fastening element coupled to said support member, said fastening element adapted to receive said connector element in a snap-fit engagement to connect said support member to said frame.

28. A back rest for a seat, said back rest comprising:
a support member defining an opening;
a separately formed bulge member having side surfaces and a central plate recessed from and integral with said side surfaces to define a cavity;
connecting means for coupling said bulge member to said support member; and
a lordosis support and a plurality of protrusions extending from said central plate and into said cavity, said lordosis support including first and second ends coupled to said plurality of protrusions, at least one of said first and second lordosis support ends being coupled to said plurality of protrusions for movement relative to said support member, said lordosis support adapted to bow upon displacement of one of said first and said second ends thereof toward one another thereby forming a curvature.

29. The back rest of claim 28, further including arching adjustor means coupled to said lordosis support for adjusting the curvature of said lordosis support, said arching adjustor means includes a first cable and a first controller, said first cable coupled to said first controller, extending into said cavity, and coupled to said lordosis support.

30. The back rest of claim 29, wherein said arching adjustor means further includes a deflection element disposed in said cavity and coupled to said support member, said first cable operationally coupled to said deflection element such that said deflection element deflects said first cable between said first controller and said lordosis support.

31. The backrest of claim 30, further including vertical adjustor means including a second cable and a second controller, wherein said vertical adjustor means further includes a deflection element disposed in said cavity and coupled to said support member, said second cable operationally coupled to said deflection element such that said deflection element deflects said second cable between said second controller and lordosis support.

32. A back rest for a seat, said back rest comprising:
a support member defining an opening;
a separately formed bulge member having side surfaces and a central plate recessed from and integral with said side surfaces to define a cavity, each side surface including a flange extending, outwardly from said side surface and away from said central plate;
connecting means for coupling said bulge member to said support member; and
a lordosis support and a plurality of protrusions extending from said central plate and into said cavity, said lordosis support including first and second ends coupled to said plurality of protrusions, at least one of said first and second lordosis support ends being coupled to said plurality of protrusions for movement relative to said support member, said lordosis support adapted to bow upon displacement of one of said first end and said second end thereof toward one another thereby forming a curvature.

33. The back rest of claim 32 further including arching adjustor means coupled to said lordosis support for adjusting the curvature of said lordosis support, said arching adjustor means includes a first cable and a first controller, said first cable coupled to said first controller, extending into said cavity, and coupled to said lordosis support.

34. The back rest of claim 33 wherein said arching adjustor means further includes a deflection element disposed in said cavity and coupled to said support member, said first cable operationally coupled to said deflection element such that said deflection element deflects said first cable between said first controller and said lordosis support.

35. The back rest of claim 33 wherein one of said side surfaces defines an opening and said first cable extends from said first controller, through said opening, and into said cavity.

36. The back rest of claim 32 wherein each of said first, and second ends of said lordosis support are coupled to said plurality of protrusions for movement relative to said support member.

37. The back rest of claim 36 further including vertical adjustor means coupled to said lordosis support for vertically moving said first and second lordosis support ends relative to said support member, said vertical adjustor means includes a second cable and a second controller coupled to said support member for movement relative thereto, said second cable coupled to said second controller, extending into said cavity, and coupled to said lordosis support.

38. The back rest of claim 37 wherein one of said side surfaces defines a hole and said second cable-extends from said second controller, through said hole and into said cavity.

39. The back rest of claim 37 wherein each of said plurality of protrusions guide the vertical movement of said lordosis support relative to said support member.

40. The back rest of claim 37 wherein said vertical adjustor means further includes a deflection element disposed in said cavity and coupled to said support member, said second cable operationally coupled to said deflection element such that said deflection element deflects said second cable between said second controller and said lordosis support.

41. The back rest of claim 32 wherein said protrusions are integral with said central plate.

42. The back rest of claim 32 wherein at least one of said plurality of protrusions guide the movement of one of the first and second ends of said lordosis support.

43. The back rest of claim 32 wherein one of said first and second ends of said lordosis support is fixedly coupled to at least one of said plurality of protrusions.

44. The back rest of claim 32 wherein at least one of said plurality of protrusions is a rail and said lordosis support is coupled to said support member by sliding engagement with said rail.

45. The back rest of claim 32 wherein said central plate includes recesses defining said protrusions and wherein said lordosis support is coupled to said support member in a snap-fit engagement with said recesses.

46. A back rest for a seat, said back rest comprising:
a frame;
a support member defining an opening;
a separately formed bulge member having side surfaces and a central plate recessed from and integral with said side surfaces to define a cavity, each side surface including a flange extending outwardly from said side surface and away from said central plate;
connecting means for coupling said bulge member to said support member; and
a connector element coupled to said frame and a fastening element coupled to said support member, said fastening element adapted to received said connector element in a snap-fit engagement to connect said support member to said frame.

47. The back rest of claim 46 wherein said connecting means including first and second apertures formed in said flanges, third and fourth apertures formed in said support member to cooperate with said first and second apertures, a first fastener disposable within said first and third aperture to couple said bulge member to said support member, and a second fastener disposable within said second and fourth apertures for coupling said bulge member to said support member.

48. The back rest of claim 46 wherein said connecting means includes first and second apertures formed in said flanges of said bulge member, first and second extensions integral with said support member and disposable within said first and second apertures to couple said bulge member to said support member.

49. The back rest of claim 48 wherein said first and second extensions each include an expandable head for coupling said bulge member to said support member.

50. The backrest of claim 46 wherein said support member is essentially rigid.

* * * * *